(12) United States Patent
Dobashi

(10) Patent No.: US 8,196,922 B2
(45) Date of Patent: Jun. 12, 2012

(54) SHEET FINISHING APPARATUS AND IMAGE FORMING APPARATUS

(75) Inventor: Shoichi Dobashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/041,339

(22) Filed: Mar. 4, 2011

(65) Prior Publication Data

US 2011/0215521 A1    Sep. 8, 2011

Related U.S. Application Data

(60) Provisional application No. 61/311,244, filed on Mar. 5, 2010.

(51) Int. Cl.
*B65H 31/04* (2006.01)
*B65H 31/10* (2006.01)
*B65H 39/00* (2006.01)

(52) U.S. Cl. ............ 271/213; 271/217; 270/58.07; 270/58.28

(58) Field of Classification Search ............ 271/213, 271/214, 215, 217; 270/58.07, 58.08, 58.28
See application file for complete search history.

(56) References Cited

FOREIGN PATENT DOCUMENTS

JP    2010-111511    5/2010

*Primary Examiner* — David H Bollinger
(74) *Attorney, Agent, or Firm* — Patterson & Sheridan, LLP

(57) ABSTRACT

There is provided a sheet finishing apparatus according to an embodiment that includes an external wall with a discharge port of sheets, a movable tray on which the sheets discharged from the discharge port are stacked and which moves up and down along the external wall according to the number of stacked sheets, and a lubricant supply unit which moves up and down together with the movable tray and applies a lubricant to the external wall.

20 Claims, 11 Drawing Sheets

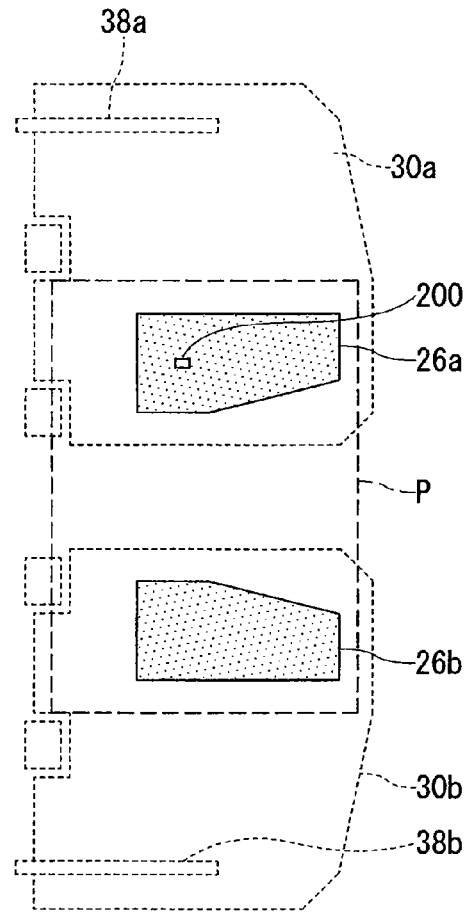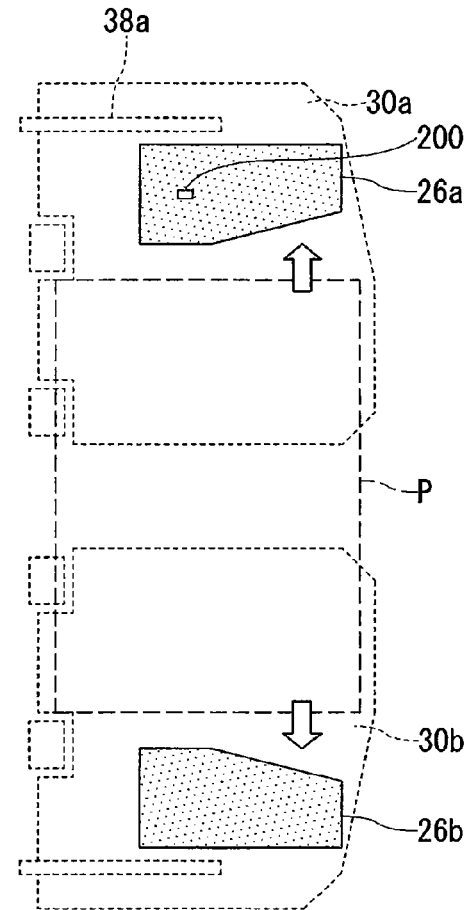
FIG. 8A
FIG. 8C
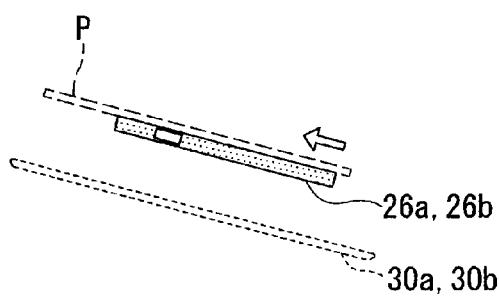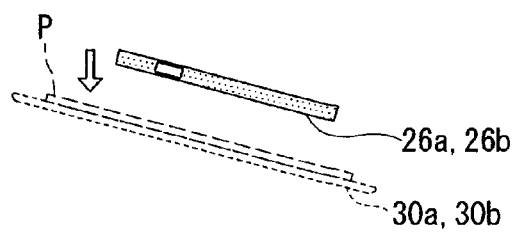
FIG. 8B
FIG. 8D

SHEET FINISHING APPARATUS AND IMAGE FORMING APPARATUS

CROSS-REFERENCE TO RELATED APPLICATIONS

This application is based upon and claims the benefit of priority from: U.S. provisional application 61/311,244 filed on Mar. 5, 2010, the entire contents of which are incorporated herein by reference.

FIELD

Embodiments described herein relate generally to a sheet finishing apparatus and image forming apparatus.

BACKGROUND

Conventionally, there is known a sheet finishing apparatus that is arranged at the downstream side of an image forming apparatus such as a copy machine, a printer, a multi-functional peripheral (MFP), or the like and performs post-processes such as sorting, stapling, and the like for a printed sheet.

There are sheet finishing apparatuses of this kind equipped with a fixed tray and a movable tray as trays for discharging and stacking sheets. If a relatively small number of sheets are to be discharged, the fixed tray is usually selected. On the other hand, if a large number of sheets, for example, 1000 or more sheets are to be discharged, the movable tray is selected. In addition, if sorting or stapling is to be performed for a sheet bundle, the movable tray is also selected.

The movable tray is configured to move up and down along an external wall of the main body of the e according to the number of sheets in order to stack a large number of sheets. If the number of sheets is small, the movable tray receives sheets at a high position, and the tray is lowered as the number of sheets becomes larger.

A stacking surface of the movable tray is inclined at a predetermined inclination angle so that the leading end of a sheet is positioned higher than the trailing end thereof. The inclination of the stacking surface of the movable tray prevents stacked sheets from falling out of the movable tray. The trailing end of a sheet slipping down along the inclination of the stacking surface comes into contact with the external wall of the main body of the sheet finishing apparatus and stops.

If the number of sheets stacked on the movable tray is large, the pressure with which the trailing ends of the sheets press against the external wall becomes high, thereby generating friction between the trailing ends of the sheets and the external wall. For this reason, when the movable tray moves up and down, unpleasant abnormal noise (friction noise) occurs between the trailing ends of sheets stacked on the movable tray and the external wall.

For this reason, there is demand for a sheet finishing apparatus which can reduce friction between the trailing ends of stacked sheets and the external wall of the main body of the sheet finishing apparatus and suppress the generation of abnormal noise.

DESCRIPTION OF THE DRAWINGS

In the accompanying drawings,

FIGS. 8A to 8D are diagrams illustrating the operation to drop a sheet from the standby tray to the processing tray;

DETAILED DESCRIPTION

Hereinafter, an embodiment of a sheet finishing apparatus and an image forming apparatus will be described with reference to the accompanying drawings.

The sheet finishing apparatus according to an embodiment includes an external wall with an outlet of sheets, a movable tray on which the sheets discharged from the outlet are stacked and which moves up and down along the external wall according to the stacked number of the sheets, and a lubricant supply unit which moves up and down together with the movable tray and applies lubricant to the external wall.

(1) Overall Structure

Figure 1:
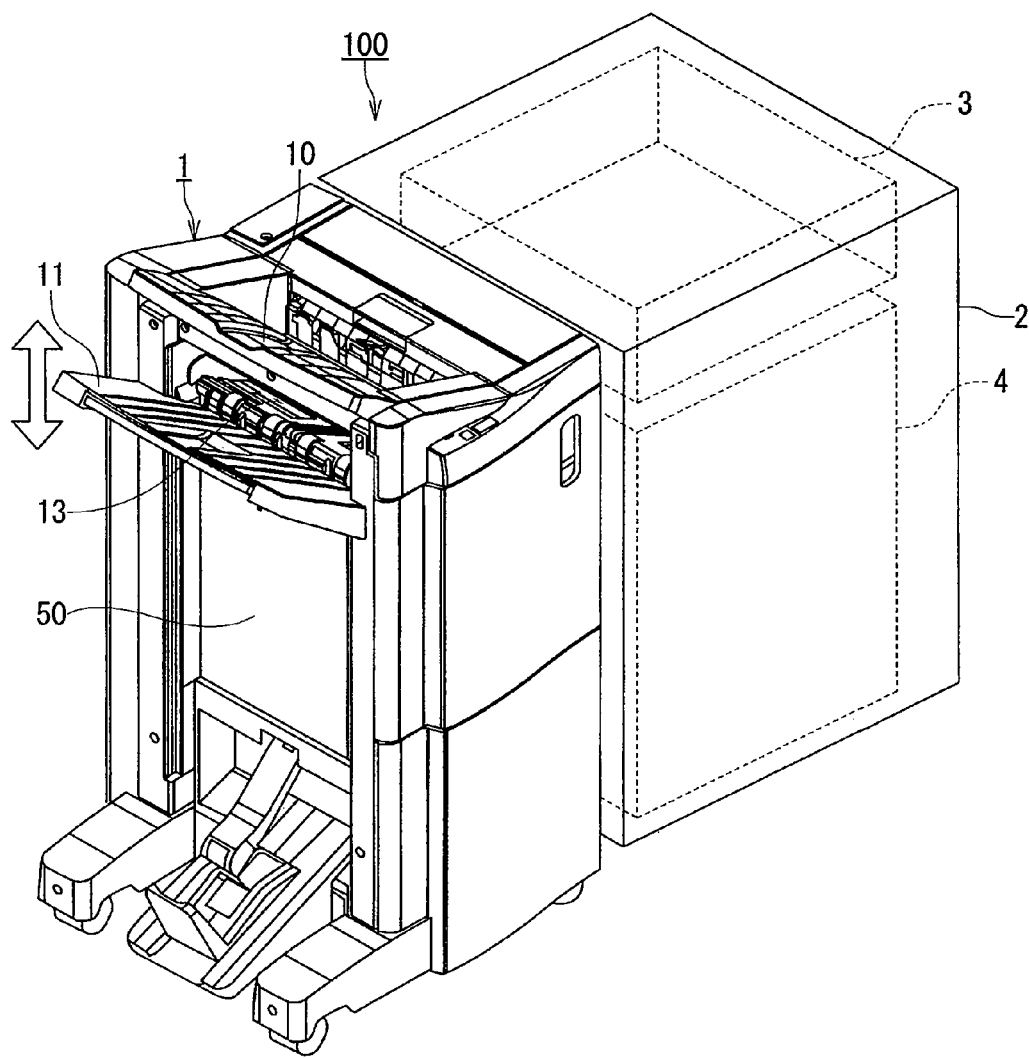
FIG. 1 is a perspective diagram showing an example of the appearance of a sheet finishing apparatus and an image forming apparatus according to an embodiment of the invention.

FIG. 1 is a perspective appearance diagram showing an example of the basic structure of an image forming apparatus 100 equipped with a sheet finishing apparatus 1 according to an embodiment of the invention. The image forming apparatus 100 includes the main body 2 of the image forming apparatus, and a sheet finishing apparatus 1 arranged adjacent to the main body 2.

The main body 2 is provided with a scanner 3 that reads original documents, and a printer 4 that prints images read by the scanner 3 on sheets.

The sheet finishing apparatus 1 includes a fixed tray 10 where sheets printed in the main body 2 are discharged and stacked, and a movable tray 11 where a large number of printed sheets is stacked moving up and down as shown by the arrow in the drawing. The sheet finishing apparatus 1 has functions of sorting a plurality of printed sheets (a bundle of sheets) and stitching the sheets with staples.

The movable tray 11 moves up and down along the external wall 50 of the discharge side of the sheet finishing apparatus 1. In FIG. 1, the position of a door 6 is the front side, and the opposite side is the rear side.

Figure 2:
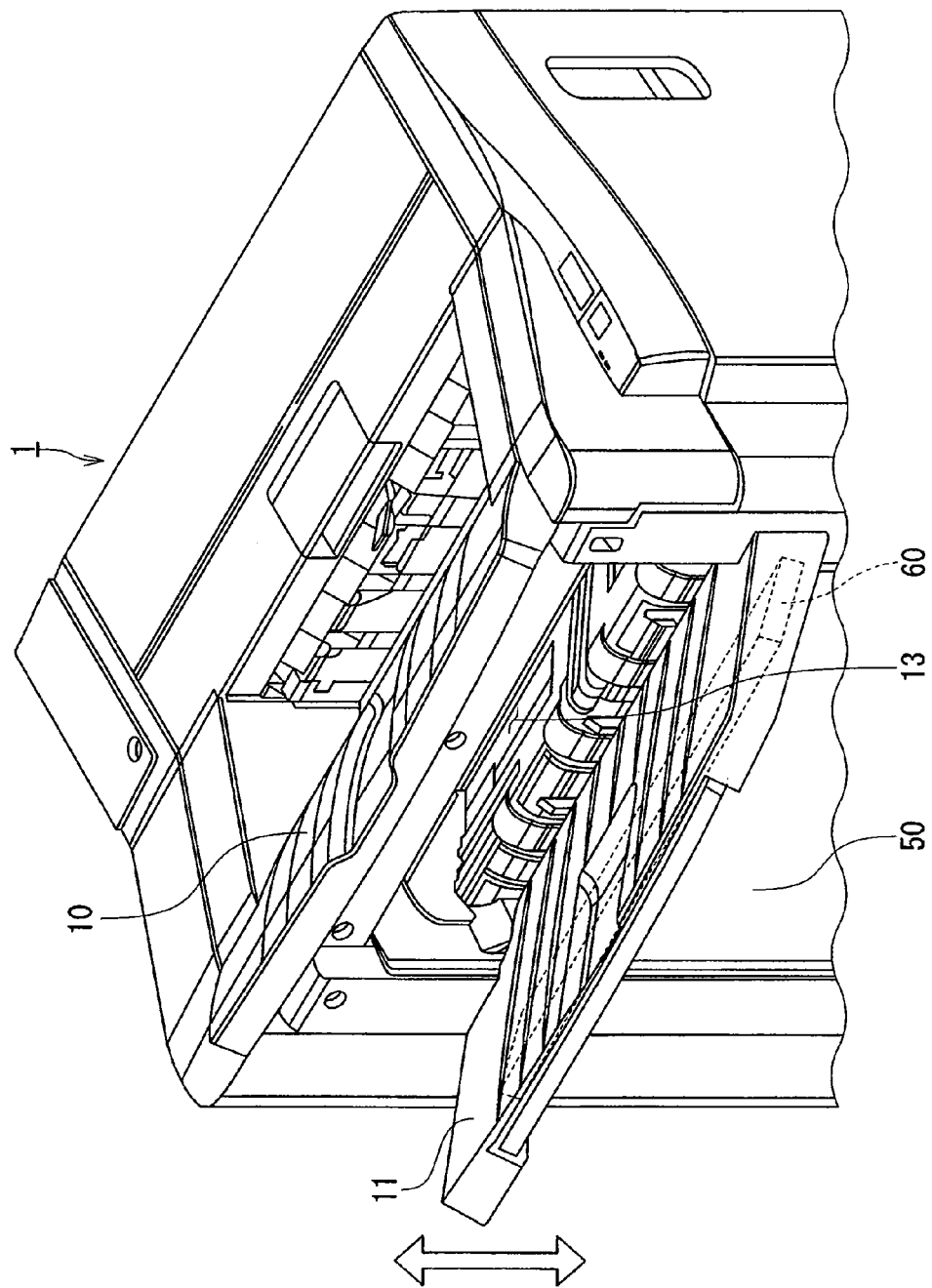
FIG. 2 is an upper portion enlarged diagram of the sheet finishing apparatus.

FIG. 2 is a perspective diagram in which the upper part of the sheet finishing apparatus 1 is enlarged. FIG. 2 is a diagram viewed from the same direction as in FIG. 1.

There is a discharge port 13 between the fixed tray 10 and the movable tray 11, and sheets or a bundle of sheets stacked on the movable tray 11 are discharged from the discharge port 13. In addition, a lubricant supply unit 60 that moves up and down with the movable tray 11 and applies lubricant to the external wall 50 is arranged at the lower surface side of the movable tray 11.

Figure 3:
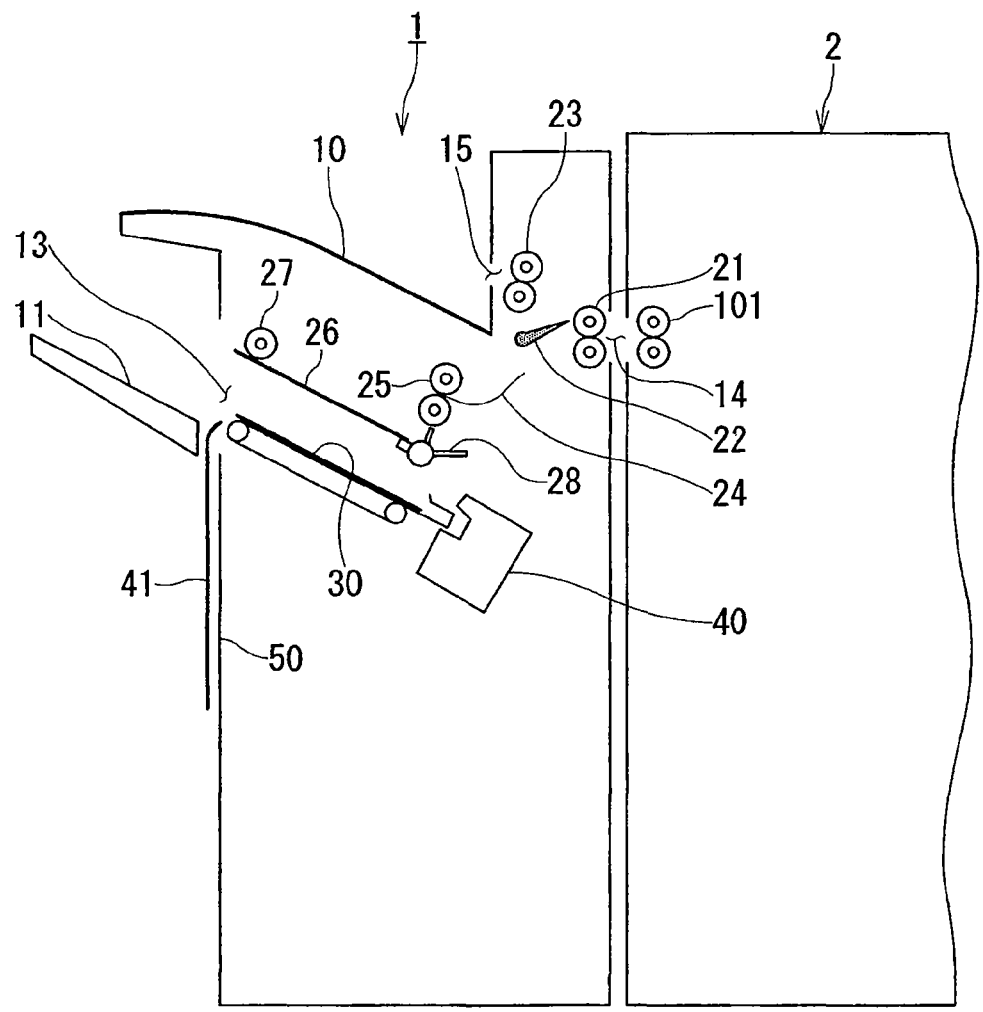
FIG. 3 is a cross-sectional diagram showing an example of the structure of the sheet finishing apparatus.

FIG. 3 is a cross-sectional diagram schematically showing the main inner structure of the sheet finishing apparatus 1.

There is an inlet roller 21 in a position opposed to an outlet roller 101 of the main body 2, and a gate flap 22 is provided in the downstream of the inlet roller. There is a fixed tray roller 23 above the gate flap 22. There is a feeding guide plate 24 curved at the lower side and a feeding roller 25 below the gate flap 22, and a standby tray 26 is provided in front of the feeding roller 25.

As shown in FIG. 3, the standby tray 26 is inclined so that the end thereof at the main body side is lower than the other end thereof in the discharge side. A buffer roller 27 is provided near the end of the standby tray 26 at the discharge side. On the other hand, a paddle 28 is provided near the end of the standby tray at the main body side.

Figure 4:
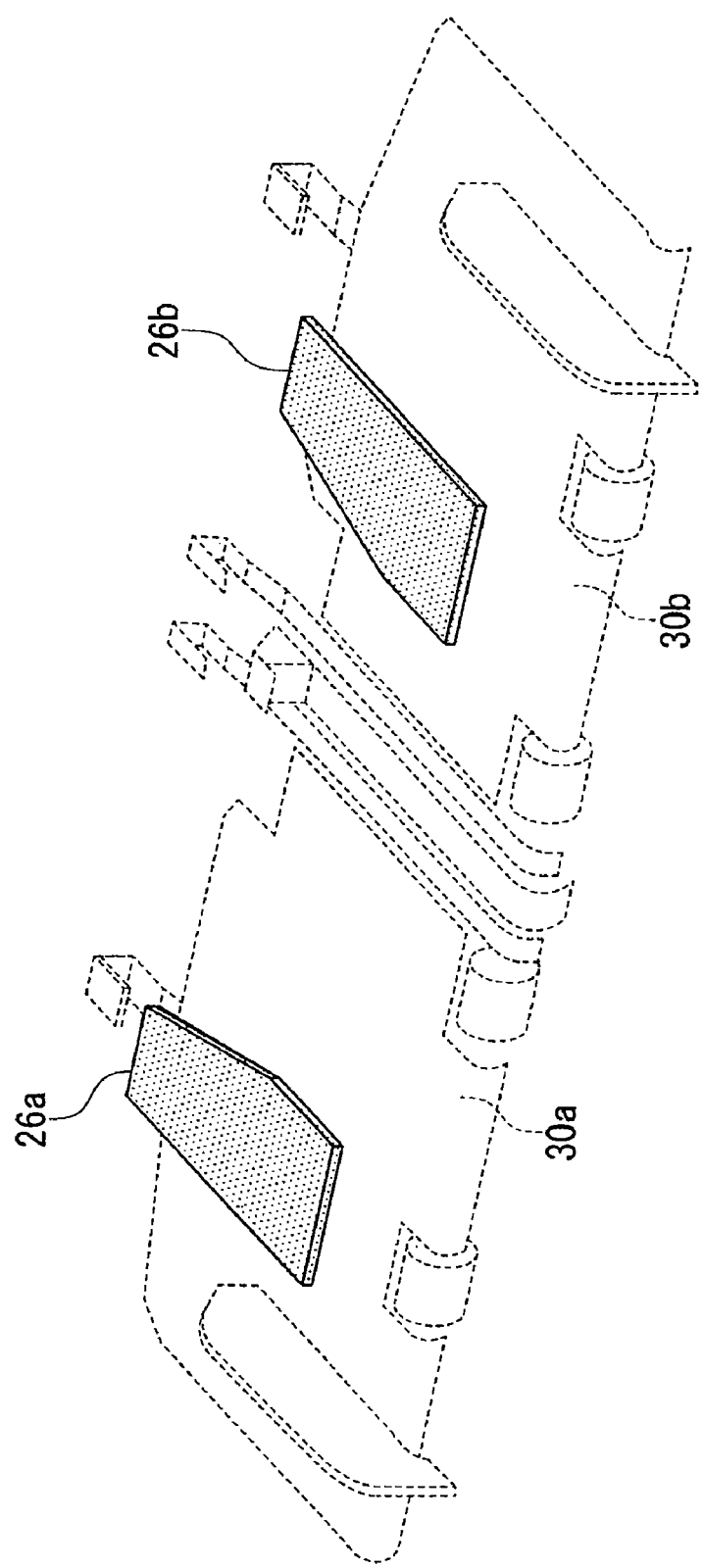
FIG. 4 is a diagram illustrating the positional relationship between a standby tray and a processing tray.

FIG. 4 is a perspective overview diagram schematically showing the structure of the standby tray 26. FIG. 4 shows not only the standby tray 26 shown by hatching but also a processing tray 30 with dashed lines below the standby tray 26. The standby tray 26 is composed of two trays which are a standby tray 26a at the rear side and a standby tray 26b at the front side, and configured to be able to be opened and closed in the front and rear directions.

There is a processing tray 30 under the standby tray 26. As shown in FIG. 3, the processing tray 30 is also inclined so that the end thereof at the main body side is lower than the other end thereof at the discharge side in the same manner as the standby tray 26. A shutter 41 is provided along the external wall 50 of the sheet finishing apparatus 1 at the discharge side between the processing tray 30 and the movable tray 11. The shutter 41 is movable up and down, rises when sheets are directly discharged from the standby tray 26 to the movable tray 11, and is configured to block the opening part between the standby tray 26 and the processing tray 30 in the discharge port 13. A stapler 40 is arranged at the end of the main body side of the processing tray 30.

Figure 5:
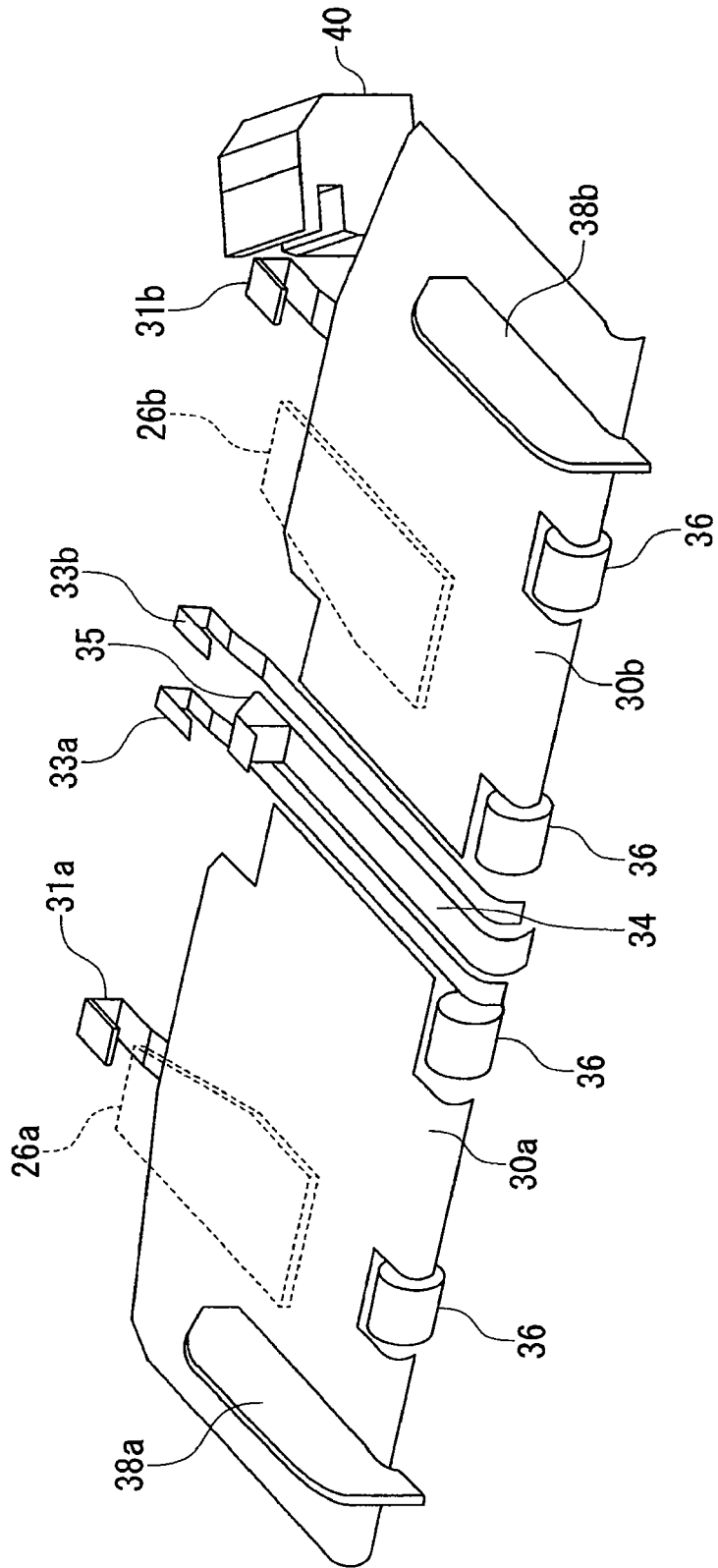
FIG. 5 is a diagram showing an example of a detailed structure of the processing tray.

FIG. 5 is a perspective diagram showing the structure of the processing tray 30 and the periphery thereof. The processing tray 30 is divided at the center by two kinds of processing trays 30a and 30b at the rear side and the front side. Each of rear stoppers 31b and 31b is provided at the edges of the processing trays 30a and 30b at the main body side, and four sheet bundle feeding rollers 36 are provided at the edges thereof at the discharge side.

At the divided part of the processing tray 30, there is a bundle claw belt 34, and ejector belts 32a and 32b arranged adjacently at both sides of the divided part.

There is a bundle claw 35 fixed to the outer circumference of the bundle claw belt 34. The bundle claw belt 34 moves the bundle claw 35 on the surface of the processing tray 30 from the main body side to the discharge side, but on the other hand, the belt continuously rotates to return to the main body side from the discharge side at the back side of the processing tray 30.

On the other hand, ejectors 33a and 33b are each fixed to the outer circumference of the ejector belts 32a and 32b. The ejector belts 32a and 32b are connected to the same driving source as that of the bundle claw belt 34 by an electromagnetic clutch (not shown in the drawing), and synchronized with the movement of the bundle claw 35 to move the ejectors 33a and 33b to near the center part of the processing tray 30. If the ejectors 33a and 33b feed the trailing end of a sheet to near the center part of the processing tray 30, the bundle claw 35 of the bundle claw belt 34 takes over the feeding of the sheet, and the bundle claw 35 pushes the trailing end of the sheet out to the movable tray 11 side. On the other hand, after the bundle claw 35 takes over the feeding of the sheet, the electromagnetic clutch is turned off, and the ejectors 33a and 33b return to the position shown in FIG. 5 (home position of the ejectors) by an elastic force of a spring not shown in the drawing. As such, while the bundle claw 35 continuously rotates around the processing tray 30, the ejectors 33a and 33b reciprocate on the processing tray 30.

The home position of the ejectors 33a and 33b and the position of the rear stoppers 31a and 31b are substantially the same.

Lateral alignment boards 38a and 38b are each provided in the processing trays 30a and 30b. The lateral alignment boards 38a and 38b are configured to be movable in the rear and front directions by a driving mechanism. There is one stapler 40 in the main body side of the processing tray 30. The stapler 40 staples a bundle of sheets printed in the main body 2.

The stack mode of the sheet finishing apparatus 1 is largely classified into two modes which are a simple stack mode and a process stack mode.

The simple stack mode is an operation mode for simply discharging and stacking printed sheets without change, and a user can select the fixed tray 10 and the movable tray 11 as a tray for stacking. The movable tray 11 is gradually lowered as the stacked number increases, thereby enabling stacking of a large number of sheets (for example, 2000 pieces, or more). For this reason, when the number of prints is large, a user can select the movable tray 11 as a discharge destination.

Figure 6:
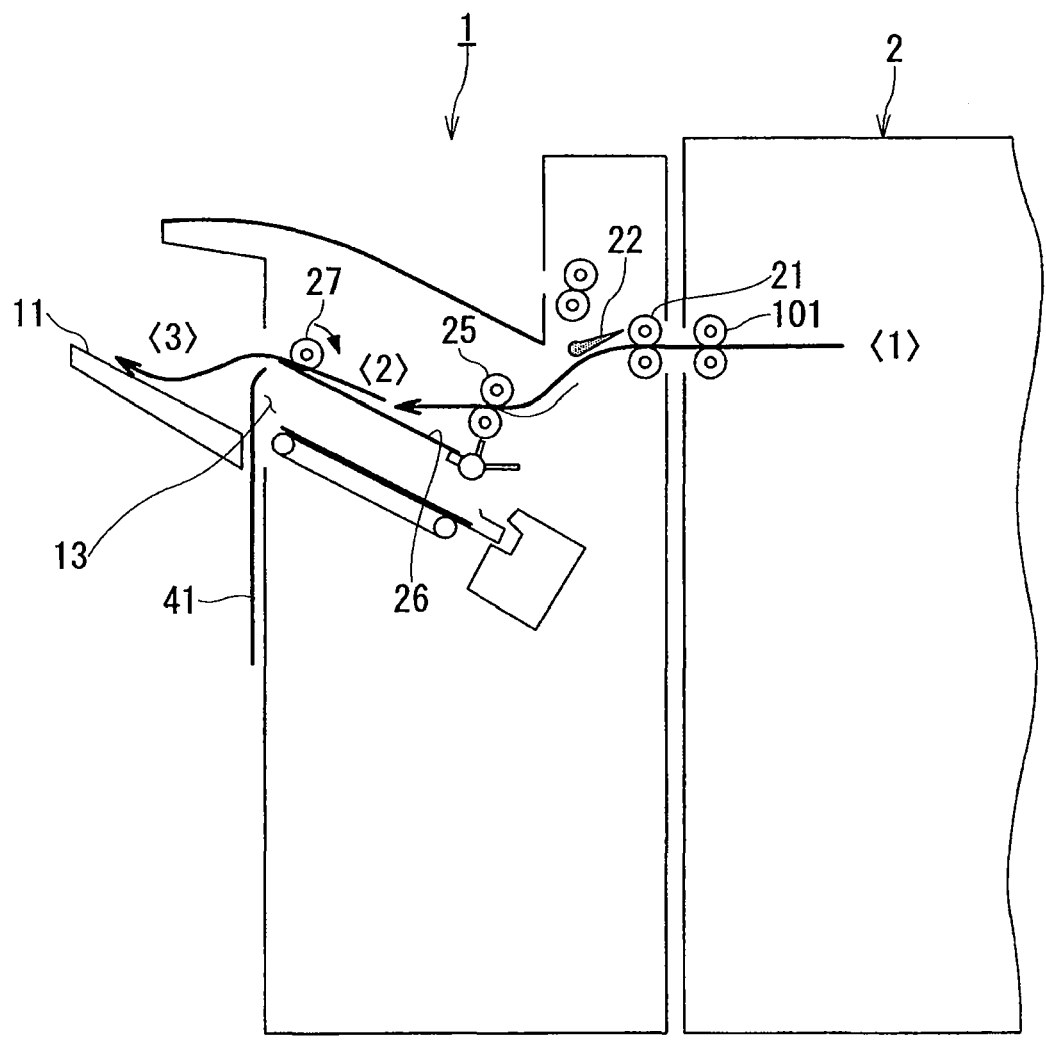
FIG. 6 is a diagram showing the flow of a sheet when the sheet is discharged to a movable tray via the standby tray.

FIG. 6 is a diagram showing the flow of a sheet in the simple stack mode when the movable tray 11 is selected as the discharge destination. If the movable tray 11 is selected, the gate flap 22 moves so as to direct the sheet downward toward the feeding roller 25 from the inlet roller 21. After a sheet printed in the main body 2 <1> is pulled in by the inlet roller 21 of the sheet finishing apparatus 1 from the outlet roller 101, the sheet is moved downward along the gate flap 22, temporarily put on the standby tray 26, and faces the buffer roller 27 <2>. At this time, the standby trays 26a and 26b are closed (the state of FIG. 8A), and do not fall on the processing tray 30. In addition, the buffer roller 27 rotates in the arrow direction of FIG. 6 while coming into contact with the standby tray 26. For this reason, sheets put on the standby tray 26 are pulled in by the buffer roller 27, discharged on the movable tray 11, and stacked sequentially <3>.

In the simple stack mode when the movable tray 11 is selected, the shutter 41 rises, and the opening part between the standby tray 26 and the processing tray 30 in the discharge port 13 is closed. The shutter 41 prevents sheets discharged to or sheets stacked on the movable tray 11 from returning to the processing tray 30 through the discharge port 13.

Figure 7:
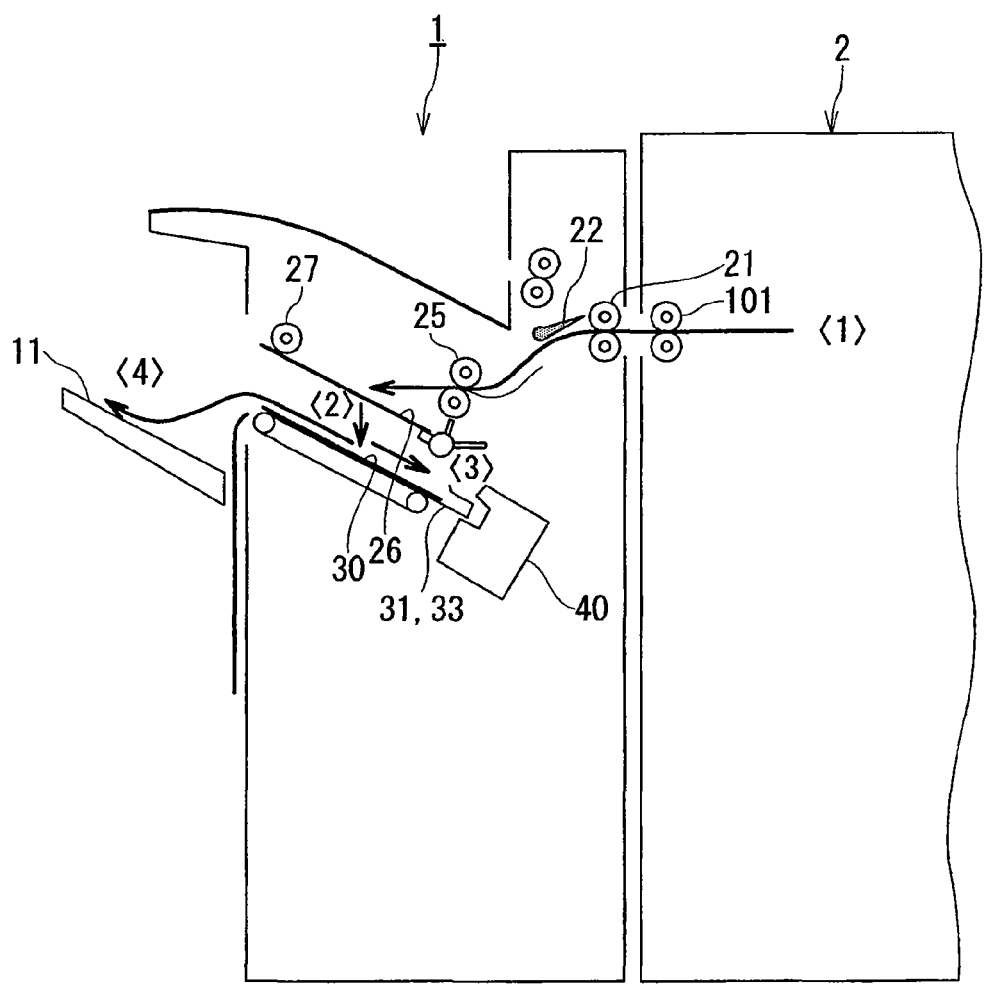
FIG. 7 is a diagram showing the flow of a sheet when the sheet is discharged to a movable tray via the processing tray.

FIG. 7 is a diagram showing the flow of a sheet in the process stack mode. In the process stack mode, a sheet or a bundle of sheets is discharged while being alternately offset in the front side and the rear side, and processes such as sorting for stacking and stapling one or two spots at the edge of the bundle of sheets can be performed. Such processes are performed on the processing tray 30.

After being pulled in by the inlet roller 21 of the sheet finishing apparatus 1 from the outlet roller 101, the sheet printed in the main body 2 <1> is moved downward, and put on the standby tray 26 temporarily. At this time, the standby trays 26a and 26b are closed as shown in FIG. 8A. The gap between the standby trays 26a and 26b varies depending on the size of the sheets, and a sheet P is received in the standby tray 26 temporarily (FIG. 8B) without being directly dropped on the processing tray 30 regardless of the size of the sheet.

After that, the standby trays 26a and 26b are opened in the front and rear directions as shown in FIG. 8C and the sheet P is dropped on the processing tray 30 (FIG. 8D).

A predetermined number of sheets is stacked on the processing tray 30, and longitudinal alignment is performed by pushing the rear edge of a bundle of sheets with the rear stoppers 31a and 31b and ejectors 33a and 33b. In addition, lateral alignment is performed by pushing the lateral alignment boards 38a and 38b to both edges of the bundle of the sheets.

The sorting process is performed by causing each bundle of the sheets that is to be positioned in the lateral alignment to be alternately offset in the front and rear sides after the longitudinal alignment.

On the other hand, the stapling process is performed by using the stapler 40 after the longitudinal and lateral alignments are completed.

The bundle of sheets completed with the sorting and the stapling is discharged from the processing tray 30 and sequentially stacked on the movable tray 11. In addition, if the movable tray 11 is selected in the simple stack mode, sheets are discharged from the standby tray 26 and sequentially stacked on the movable tray 11.

(2) Lubricant Supply Unit

As described above, if the number of sheets stacked on the movable tray 11 is great, pressure resulting from the trailing ends of the sheets pushing against the external wall 50 becomes high, thereby generating friction between the trailing ends of the sheets and the external wall 50. For this reason, when the movable tray 11 moves up and down, unpleasant abnormal noise (friction noise) is generated between the external wall and the trailing ends of the sheets stacked on the movable tray 11.

In order to suppress the generation of the abnormal noise by the friction, a lubricant is applied to the external wall 50 during the manufacturing stage in the related art. In addition, since a lubricant is worn out by friction in the trailing ends of sheets due to use over a certain period of time, maintenance personnel performed re-application of lubricant at a client premises on a regular basis.

However, the load resulting from the use of the movable tray 11 varies depending on users, and the lubricant in a apparatus of a user whose use frequency of the movable tray 11 is high may be worn out before a regular application. Moreover, such a regular application operation by maintenance personnel also increases maintenance costs.

In order to counter such a problem, in the sheet finishing apparatus 1 according to the embodiment, a lubricant supply unit 60 is provided in the movable tray 11 so as to automatically apply a lubricant to the external wall 50 from the lubricant supply unit 60.

Furthermore, as described above, the shutter 41 is provided above the external wall 50, and the trailing ends of sheets stacked on the movable tray 11 come into contact not only with the external wall 50 but also with the shutter 41. Thus, the lubricant supplied from the lubricant supply unit 60 is applied not only to the outer surface of the external wall 50 but also to the outer surface of the shutter 41. Hence, hereinafter, when simply the external wall 50 is mentioned, the shutter 41 is also included.

Figure 9:
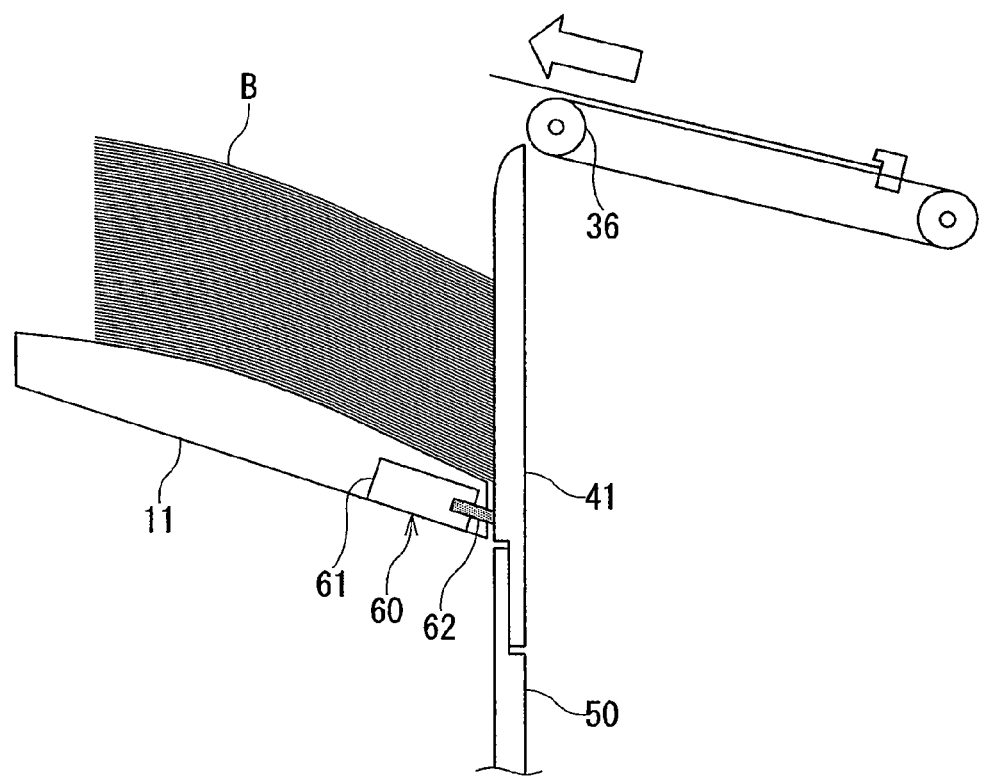
FIG. 9 is an outlined cross-sectional diagram in which the state of a bundle of sheets stacked in the movable tray is seen from the front side.

FIG. 9 is an outlined cross-sectional diagram in which a state where a bundle of sheets B is stacked on the movable tray 11 is viewed from the front side. The lubricant supply unit 60 is arranged in the lower surface side of the movable tray 11, and includes a case 61 and an application member 62 of which a part projects from the case 61. The tip portion of the application member 62 comes into contact with the external wall 50.

Figure 10:
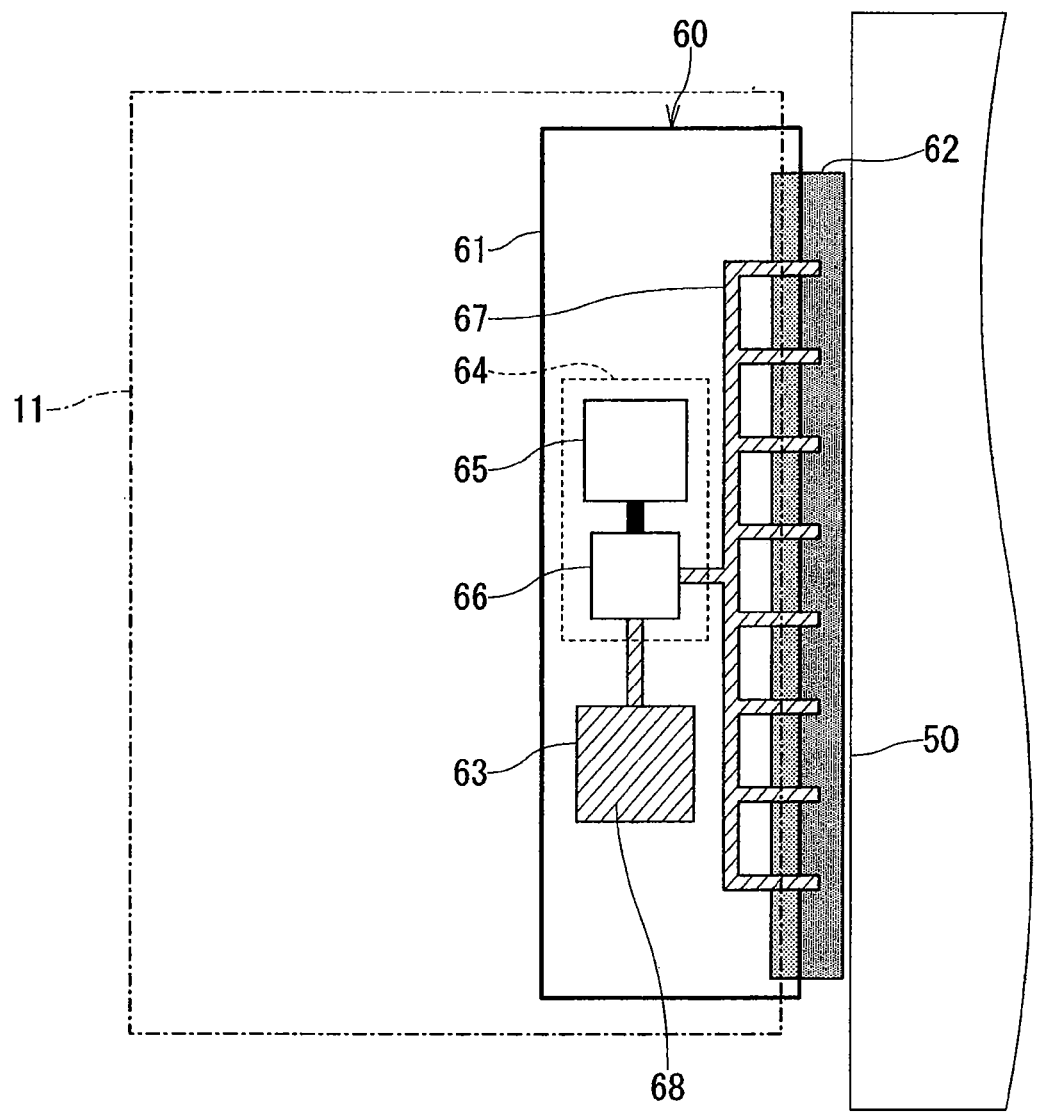
FIG. 10 is a schematic diagram showing the inner structure of a lubricant supply unit 60.

FIG. 10 is a schematic diagram showing the inner structure of the lubricant supply unit 60, and is a diagram in which the lubricant supply unit 60 is viewed from the above.

The lubricant supply unit 60 has the case 61 in a box shape, and the case 61 accommodates the application member 62, a lubricant containing unit 63, a pump 64, and a pipe 67. A part of the application member 62 is exposed from the case 61, and the end thereof comes into contact with the external wall 50 of the main body of the sheet finishing apparatus. The pump 64 is composed of a motor 65 and an impeller unit 66.

The lubricant containing unit 63 contains a lubricant 68. The lubricant 68 is a liquid lubricant with a quick-drying property of which a solvent dries at room temperature. The pipe 67 comes out from the lubricant containing unit 63 passing through the impeller unit 66, and then, the pipe 67 is branched in a plurality of directions, and branched tips are split and arranged inside the application member 62. The tips of each branched pipe are open.

The pump 64 is controlled to drive by a control unit not shown in the drawing. If the pump 64 is driven, that is, if the motor 65 rotates to make an impeller inside the impeller unit 66 rotate, the lubricant 68 in the lubricant containing unit 63 is fed under pressure to the application member 62 from a plurality of tips of the pipe 67.

The application member 62 is made of an elastic material that can absorb liquids, for example, felt, sponge rubber having open cell, or the like. The driving of the pump 64 causes the lubricant 68 to penetrate inside the application member 62 from each open end of the pipe 67, and reach the end of the application member 62. Then, the lubricant 68 that ooze out from the end of the application member 62 arrives at the external wall 50 of the main body of the sheet finishing apparatus 1.

Figure 11B:
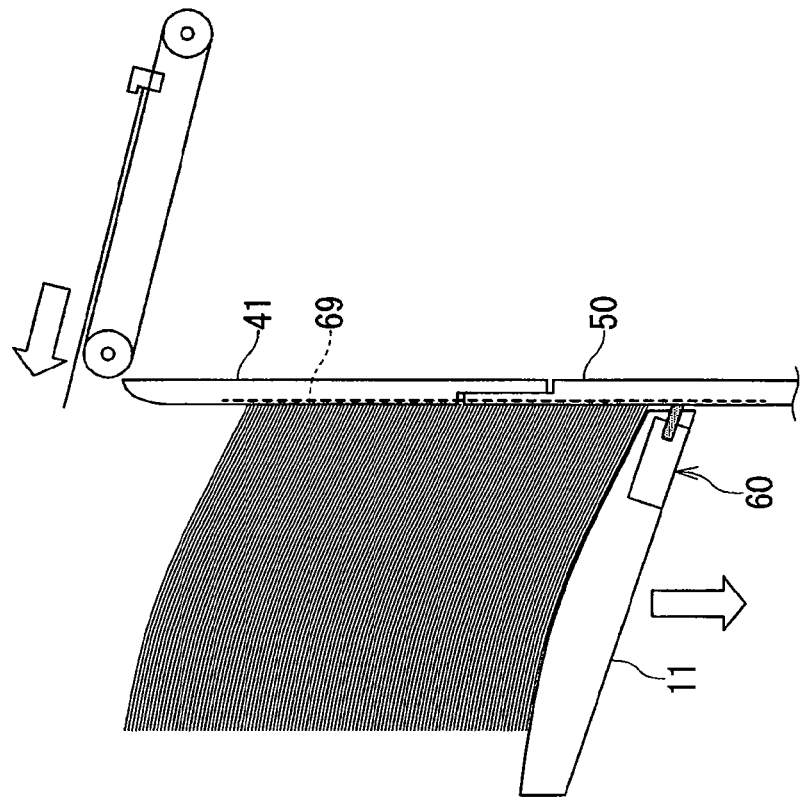
FIGS. 11A and 11B are diagrams showing a state where a lubricating coat is formed on the surface of the external wall.
Figure 11A:
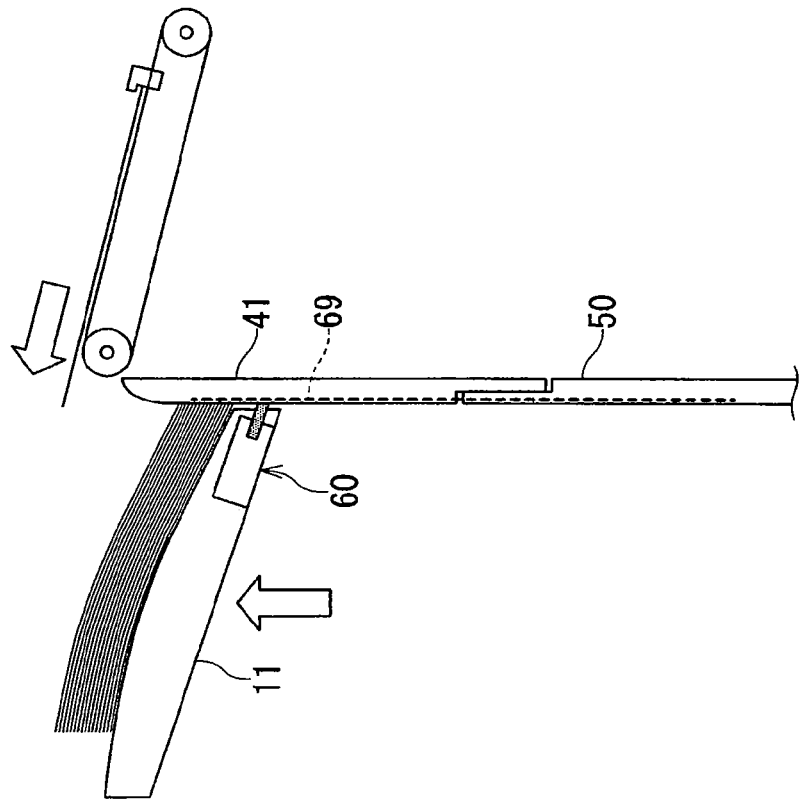

FIGS. 11A and 11B are diagrams showing the state where a lubricating coat 69 is formed on the surface of the external wall 50. The lubricant supply unit 60 moves up and down together with the movable tray 11. Thus, the lubricant 68 is applied in a wide range on the surface of the external wall 50 by up-and-down movement of the movable tray 11. As described above, the lubricant 68 is a liquid lubricant with a quick-drying property of which a solvent dries at room temperature. Therefore, the lubricant dries soon after the application, and the lubricating coat 69 is formed on the surface of the external wall 50.

Friction generated between the trailing ends of the sheets stacked on the movable tray 11 and the external wall 50 is reduced by the lubricant coat 69, thereby preventing the generation of abnormal noise.

When the movable tray 11 moves up and down, the lubricant coat 69 is formed by supplying the lubricant 68 to the application member 62 with the pump 64 driving for a predetermined supply period. Once the lubricant coat 69 is formed, the effect of reduced friction continues for a certain period of time. Therefore, it is not necessary to supply the lubricant 68 every time that the movable tray 11 moves.

In that sense, the time to start to supply the lubricant 68 may be decided according to the number of movements of the movable tray 11 in the upward and downward directions after the formation of the lubricant coat 69. Alternatively, the time to start to supply the lubricant 68 may be decided according to elapsed time from the previous application of the lubricant 68 or the formation of the lubricant coat 69.

For example, the control unit is provided with a counter that counts the number of movements of the movable tray 11 in the upward and downward directions, the lubricant 68 is started to be supplied when a counted value becomes a predetermined one, and the counter may be reset after the formation of the lubricant coat 69 is completed. Alternatively, the control unit is provided with a timer, the lubricant 68 is started to be supplied when a value of the timer becomes a predetermined one, and the timer may be reset after the formation of the lubricant coat 69 is completed.

As described above, according to the sheet finishing apparatus 1 and the image forming apparatus 100 of the embodiment, it is possible to reduce friction generated between the trailing ends of sheets stacked on the movable tray 11 and the external wall 50 of the main body of the sheet finishing apparatus and to suppress the generation of abnormal noise.

In addition, it is not necessary for maintenance personnel to regularly perform application of a lubricant at a client premises, and therefore it is possible to lower maintenance costs.

Furthermore, by determining the start time of application based on the number of movements of the movable tray 11, it is possible to automatically perform re-application of a lubricant for a apparatus of a user whose use frequency of the movable tray 11 is high before the lubricant is worn out.

While certain embodiments have been described, these embodiments have been presented by way of example only, and are not intended to limit the scope of the invention. Indeed, the novel apparatuses and units described herein may be embodied in a variety of other forms; furthermore, various omissions, substitutions and changes in the form of the apparatuses and units described herein may be made without departing from the spirit of the invention. The accompanying claims and their equivalents are intended to cover such forms or modifications as would fall within the scope and spirit of the invention.

What is claimed is:

1. A sheet finishing apparatus comprising:
   an external wall which has a discharge port of sheets;
   a movable tray on which the sheets discharged from the discharge port are stacked and which receives the sheets at a high position if the number of the sheets is small and is lowered along the external wall as the number of the sheets becomes larger; and
   a lubricant supply unit, a part of which comes into contact with the external wall, the lubricant supply unit being arranged at a lower surface side of the movable tray and moving up and down together with the movable tray and supplying a lubricant to the external wall.

2. The apparatus according to claim 1,
   wherein the lubricant supply unit includes:
      a lubricant containing unit which contains the lubricant,
      an application member which applies the lubricant to the external wall,
      a pipe which supplies the lubricant to the application member from the lubricant containing unit, and
      a pump which feeds the lubricant under pressure to the application member from the lubricant containing unit through the pipe.

3. The apparatus according to claim 2,
   wherein the lubricant supply unit further includes a case which accommodates at least the lubricant containing unit, the pipe, and the pump, and
   wherein the case is arranged at the lower surface side of the movable tray.

4. The apparatus according to claim 2, wherein the lubricant is a liquid lubricant with a quick-drying property, and which forms a lubricating coat on the external wall after the application to the external wall.

5. The apparatus according to claim 2, wherein the application member is made of an elastic material that can absorb a liquid.

6. The apparatus according to claim 5, wherein the elastic material is felt.

7. The apparatus according to claim 5, wherein the elastic material is sponge rubber with open cells.

8. The apparatus according to claim 2, further comprising:
   a control unit which controls the pump,
   wherein the pump supplies the lubricant to the application member for a predetermined supply period starting from a supply start time that is under control of the control unit.

9. The apparatus according to claim 8, wherein the control unit determines the supply start time based on the number of movements of the movable tray in the upward and downward directions.

10. The apparatus according to claim 8, wherein the control unit determines the supply start time based on the elapsed time from the previous application.

11. An image forming apparatus comprising:
    a scanner which reads an original document;
    a printer which prints an image read in the scanner on sheets;
    a discharge port through which the sheets printed by the printer are discharged;
    an external wall with the discharge port;
    a movable tray on which the sheets discharged from the discharge port are stacked and which receives the sheets at a high position if the number of the sheets is small and is lowered along the external wall as the number of the sheets becomes larger; and
    a lubricant supply unit, a part of which comes into contact with the external wall, the lubricant supply unit being arranged at a lower surface side of the movable tray and moving up and down together with the movable tray and supplying a lubricant to the external wall.

12. The apparatus according to claim 11,
    wherein the lubricant supply unit includes:
       a lubricant containing unit which contains the lubricant,
       an application member which applies the lubricant to the external wall,
       a pipe which supplies the lubricant to the application member from the lubricant containing unit, and
       a pump which feeds the lubricant under pressure to the application member from the lubricant containing unit through the pipe.

13. The apparatus according to claim 12,
    wherein the lubricant supply unit further includes a case which accommodates at least the lubricant containing unit, the pipe, and the pump, and
    wherein the case is arranged at the lower surface side of the movable tray.

14. The apparatus according to claim 12, wherein the lubricant is a liquid lubricant with a quick-drying property, and which forms a lubricating coat on the external wall after the application to the external wall.

15. The apparatus according to claim 12, wherein the application member is made of an elastic material that can absorb a liquid.

16. The apparatus according to claim 15, wherein the elastic material is felt.

17. The apparatus according to claim 15, wherein the elastic material is sponge rubber with open cells.

18. The apparatus according to claim 12, further comprising:
    a control unit which controls the pump,
    wherein the pump supplies the lubricant to the application member for a predetermined supply period starting from a supply start time that is under control of the control unit.

19. The apparatus according to claim 18, wherein the control unit determines the supply start time based on the number of movements of the movable tray in the upward and downward directions.

20. The apparatus according to claim 18, wherein the control unit determines the supply start time based on the elapsed time from the previous application.

* * * * *